Figure 3:
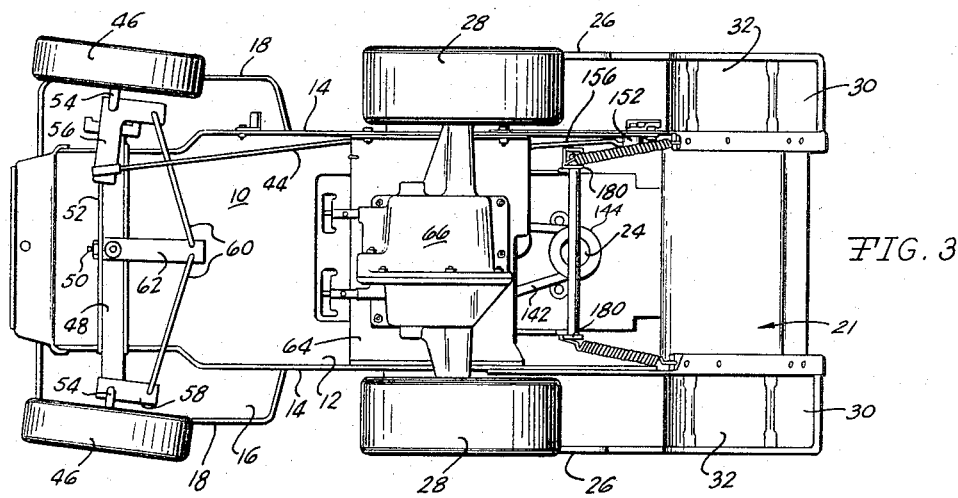

Sept. 5, 1967　　　R. A. HANSON ETAL　　　3,339,662
TRACTOR STRUCTURE
Filed June 19, 1964　　　　　　　　　　　　4 Sheets-Sheet 1
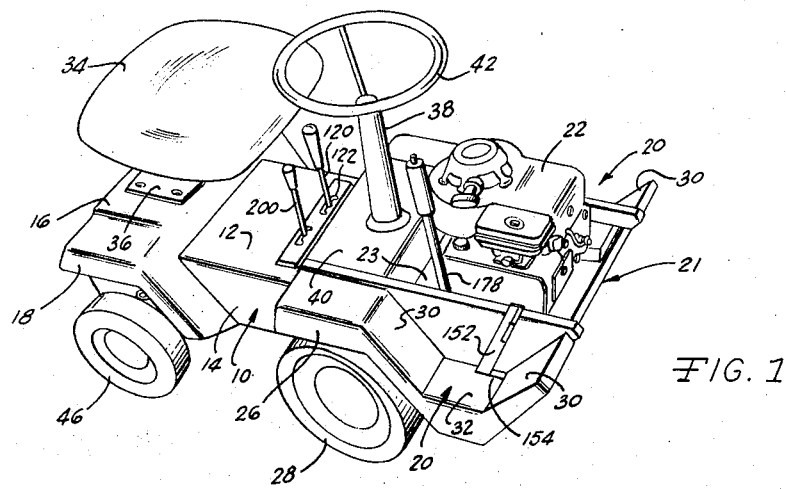
FIG. 1
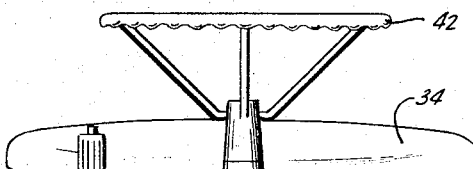
FIG. 2
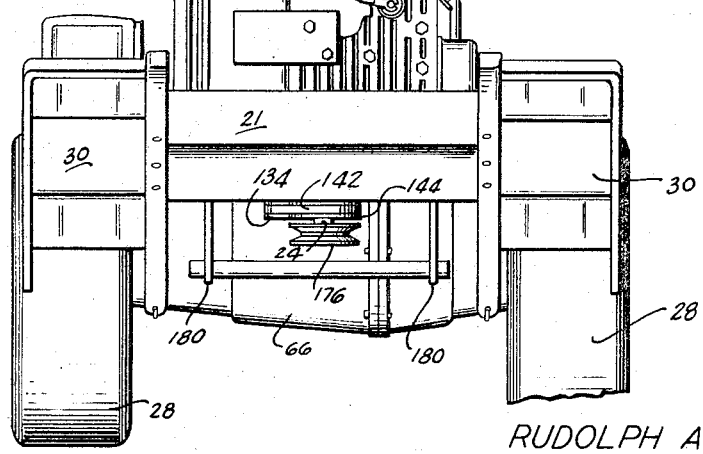
INVENTOR
RUDOLPH A. HANSON
EDWARD J. ZIEGLER
JOHN E. FISCHER
BY Beaman & Beaman
ATTORNEYS Sept. 5, 1967   R. A. HANSON ET AL   3,339,662
TRACTOR STRUCTURE Filed June 19, 1964   4 Sheets-Sheet 2

INVENTOR
RUDOLPH A. HANSON
EDWARD J. ZIEGLER
JOHN E. FISCHER
BY
ATTORNEYS

Sept. 5, 1967     R. A. HANSON ETAL     3,339,662
TRACTOR STRUCTURE
Filed June 19, 1964                     4 Sheets-Sheet 3

INVENTOR
RUDOLPH A. HANSON
EDWARD J. ZIEGLER
JOHN E. FISCHER
BY
ATTORNEYS

INVENTOR
RUDOLPH A. HANSON
EDWARD J. ZIEGLER
JOHN E. FISCHER
BY Beaman & Beaman
ATTORNEYS 3,339,662
TRACTOR STRUCTURE
Rudolph A. Hanson, Edward J. Ziegler, and John E. Fischer, Jackson, Mich., assignors to Yard-Man, Inc., Jackson, Mich., a corporation of Michigan
Filed June 19, 1964, Ser. No. 376,416
5 Claims. (Cl. 180—54)

The invention pertains to a tractor, and particularly relates to a small tractor of the lawn and garden type which supports the operator.

Small riding tractors are finding increased usage for domestic purposes wherein the tractors may be employed for lawn cutting and other light duty applications such as towing small trailers and refuse containers, snow plowing, lawn rolling, etc. In that such tractors are often employed in restricted space areas, particularly during lawn work, a high degree of maneuverability is desired. For shipping purposes, it is of advantage to keep the weight of the tractor at a minimum. However, if the tractor weight is kept relatively low, the traction characteristics will be adversely affected, and it is one of the features of the invention that superior traction is provided in a relatively lightweight tractor. The superior maneuverabilty and traction characteristics provided by the tractor, in accord with the invention, largely results from the fact that the front wheels of the tractor, which constitute the driving wheels, bear much of the weight of tractor and rider, and the rear wheels perform the steering.

It is, therefore, an object of the invention to provide a lightweight tractor having superior maneuverability and traction characteristics which result from a unique construction, including location of the motor and other basic components with respect to the drive wheels.

Another object of the invention is to provide a light-duty tractor wherein superior visibility is provided, particularly at the front of the tractor, whereby front mounted attachments such as rotary or reel lawn mowers will be located within the normal area of vision and ahead of the tractor wheels.

Yet a further object of the invention is to provide a light-duty tractor which is of a unique and attractive appearance, and is compact in construction for maneuverability through restricted areas and ease of storage.

A further object of the invention is to provide a light-duty tractor employing a foot operated clutch and brake combination whereby engagement of the clutch disengages the brake and disengagement of the clutch automatically applies brake means to the drive wheels.

An additional object of the invention is to provide a light-duty tractor employing a pressed steel frame wherein the tractor structure may be readily manufactured of sheet metal at a relatively low cost, and have a high degree of rigidity.

A further object of the invention is to provide a transmission and differential unit for a light-duty tractor wherein the tractor drive wheels are interconnected through planetary gear means, and wherein the planetary gearing may be selectively disengaged to interlock the drive wheels for positive simultaneous rotation.

Figure 4:
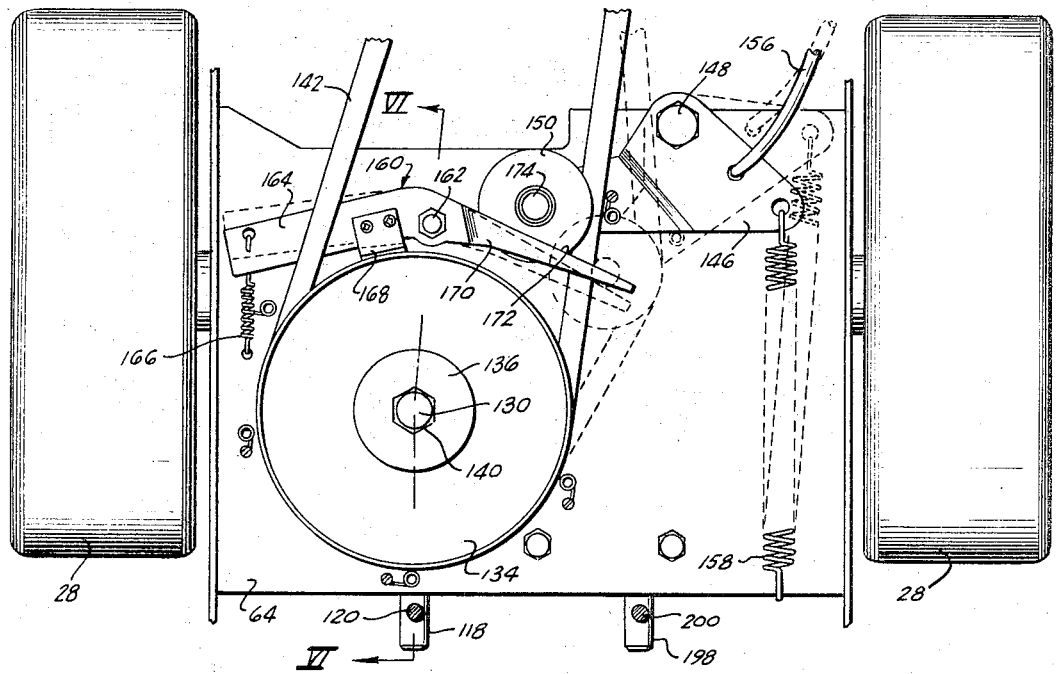
Figure 5:
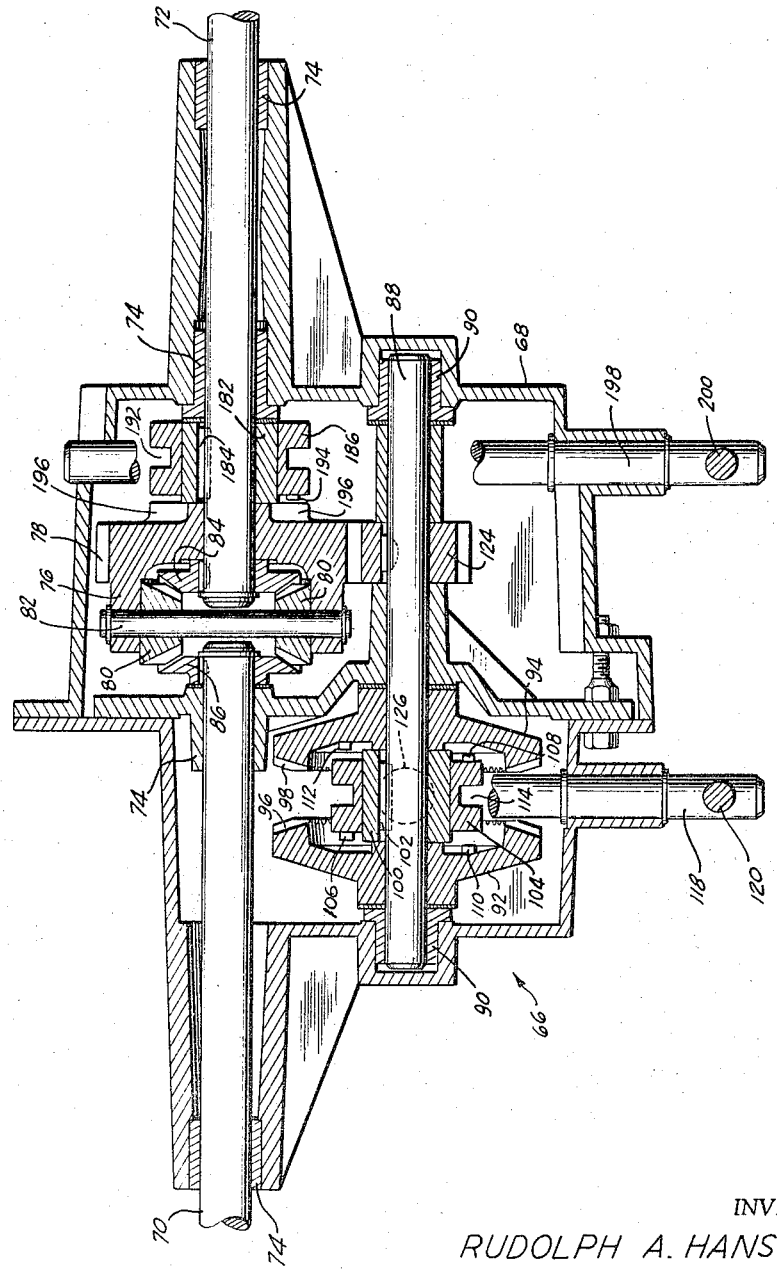
Figure 6:
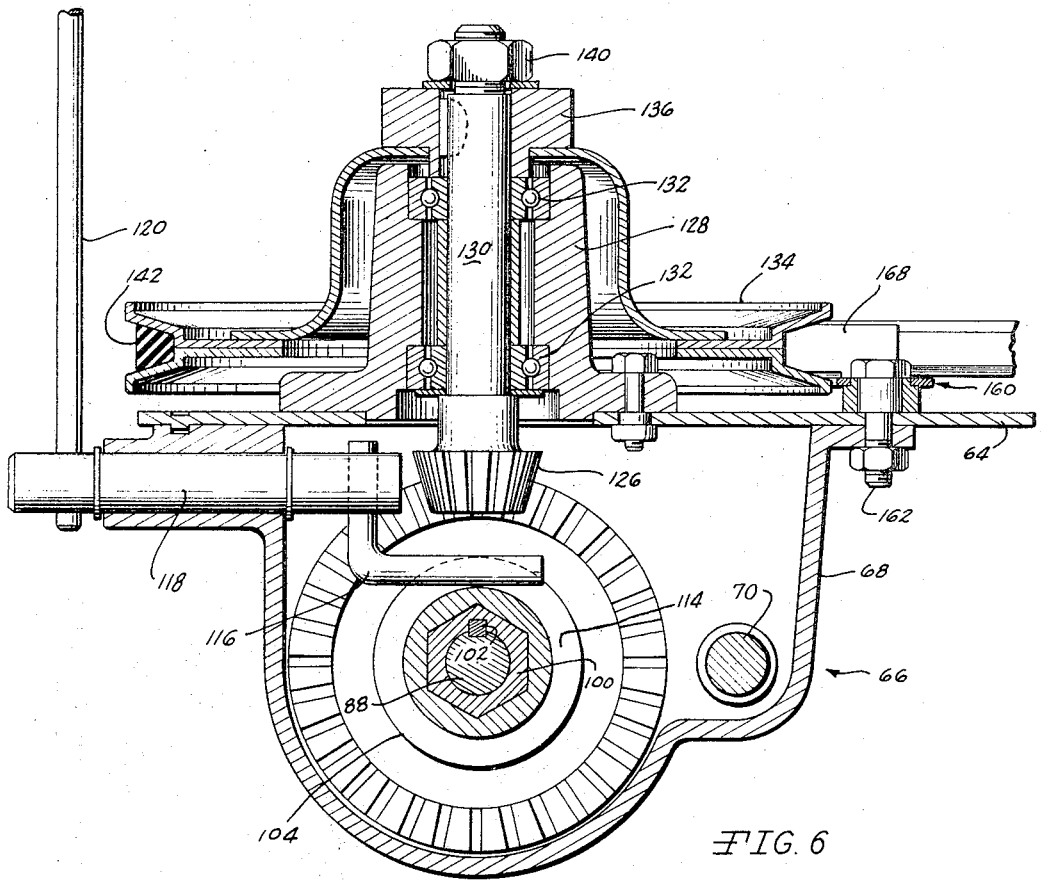
Figure 7:
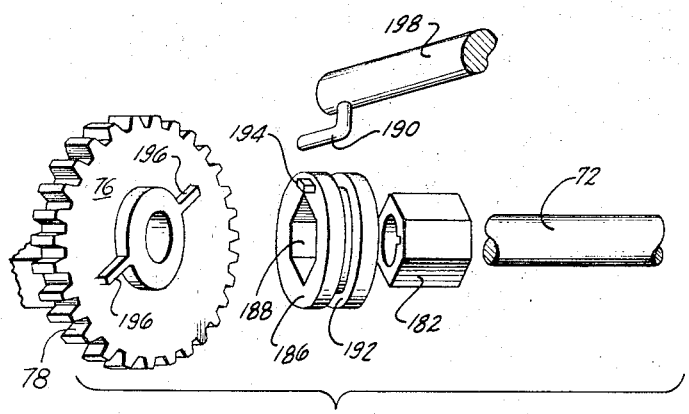

These and other objects of the invention arising from the details and relationships of the components of an embodiment thereof will be apparent from the following description and accompanying drawings wherein:

FIG. 1 is a perspective view of a tractor, in accord with the invention,

FIG. 2 is a front elevational view of the tractor constructed in accord with the invention, FIG. 3 is a bottom view of the tractor, FIG. 4 is an enlarged, plan, detail view of the transmission differential top plate illustrating the brake in the operative position and the clutch mechanism in the declutched position in full lines, and illustrating the brake mechanism in the inoperative position and the clutch mechanism in the engaged position in dotted lines, FIG. 5 is a plan, sectional view of the transmission differential employed with the tractor in accord with the invention, FIG. 6 is an elevational, sectional view of the transmission differential as taken along section VI—VI of FIG. 4, and FIG. 7 is an exploded perspective view of the gearing components employed in the differential "lock-out" mechanism.

The frame of the tractor, in accord with the invention, is constructed of sheet steel which has been pressed and formed to the desired configuration. The basic member of the frame is the inverted channel member 10 which forms the central and rear portions of the tractor. The channel member 10 includes a horizontally disposed base portion 12 from which depends vertically, downwardly extending side portions 14. As will be noted in FIG. 3, the member 10 is formed in the rear so that the side portions 14 are spaced closer together than at the central and front regions. A formed rear portion 16, wherein the outer longitudinal edges 18 thereof constitute fenders, is attached to the rear portion of the channel member 10. The front portion of the frame is formed of several pressed steel shapes which are affixed to the front of the channel member 10 and include fender and foot well portions 20 affixed to the sides of the front portion 21. The tractor engine 22 is mounted upon the front portion 21 within the recessed portion 23 thereof and is of the vertical crankshaft type having a drive shaft 24 extending below the engine and accessible below the recessed portion 23.

The fender and well portions 20, which are attached to the frame front portion 21, are of a unique construction whereby the portion 26 forms a fender disposed above the drive wheels 28. It will be appreciated that the outer edges of the fender portions 26 are substantially aligned with the outer edge of the drive wheels 28, FIG. 3, whereby the fenders do not interfere with the positioning of the tractor adjacent buildings, trees, and other obstacles when it is desired to trim adjacent such obstacles during lawn mowing or similar operations. The front portions of the portions 20 constitute wells adapted to receive the operator's feet. The wells include downwardly converging side portions 30 which intersect a horizontally disposed portion 32 and are of sufficient width to permit the operator's feet to be received within the wells and be protected thereby. A seat 34 is mounted upon the rear frame portion 16 by means of a spring steel member 36, FIG. 1.

Between the engine 22 and the seat 34 the steering column 38 arises through the sheet metal shroud 40 affixed to member 10. The column 38 is affixed to the central base portion 12 and includes bearing members whereby a steering shaft may be rotatably supported therein. The steering shaft, not shown, has affixed at the upper end thereof, the steering wheel 42 which is of an annular configuration disposed in a substantially horizontal plane, note FIG. 2. The lower end of the steering shaft extends below the base portion 12 and attaches to a steering link 44, FIG. 3, which extends to a steering plate 56 affixed to one of the steerable wheels 46.

The steerable wheels 46 are mounted upon an axle 48 which is affixed to the tractor frame portion, on the underside thereof, by means of a pivot pin 50. The pivot pin 50 is supported upon an inverted channel member 52 affixed to the member 10 and is disposed longitudinally with respect to the axis of the tractor, whereby the axle 48 is capable of pivoting in a plane perpendicularly disposed to the longitudinal axis and direction of movement of the tractor. Suitable vertically disposed bearing means are provided at the ends of the axle 48 to receive the pivot pins of the axles 54 of the steerable wheels 46, whereby the steering wheels may be pivotally mounted to the axle for steering purposes. The steering plate 56 is affixed to the axle of one of the steering wheels 46, and a steering plate 58 affixed to the other steerable wheel is interconnected to the plate 56 by means of linkages 60 interconnected to a pivotally mounted intermediary bar 62. The steering link 44 is connected to plate 56 and it will be appreciated that as the steering wheel 42 is rotated, the steerable wheels 46 will be positioned as desired.

A horizontally disposed plate 64 is affixed to the underside of the frame between the side portions 14 of member 10 and serves as the mounting means, and upper cover, for the combination transmission and differential unit 66.

As best appreciated from FIGS. 4, 5 and 6, the transmission and differential unit 66 includes a cast housing 68 in which the concentric axle shafts 70 and 72 are rotatably mounted on bearings 74. The axle shaft 72 is provided at its inner end with a differential case 76 which is rotatably mounted thereon. The differential case 76 includes peripherally disposed spur gear teeth 78 formed thereon and supports a pair of beveled planetary pinions 80 rotatably mounted upon the differential case supported shaft 82. A side bevel gear 84 is keyed to the inner end of the axle 72 and a side bevel gear 86 is keyed to the inner end of the axle 70, and both of the side gears 84 and 86 are in mesh with the planetary pinion gears 80. Although not shown in FIG. 5, a drive wheel 28 is affixed at the outer end of each of the axles 70 and 72.

The transmission differential unit 66 also includes a shaft 88 disposed parallel to and spaced from the axles 70 and 72. The shaft 88 is rotatably mounted in housing 68 by bearings 90, and a pair of bevel gears 92 and 94 are rotatably mounted thereon. The bevel gears 92 and 94 include teeth 96 and 98, respectively. A hexagonally-shaped sleeve 100, FIG. 6, is mounted upon the shaft 88 intermediate the bevel gears 92 and 94 and is keyed thereto by a key 102. A clutch dog 104 is axially slidably mounted upon the sleeve 100 and includes a hexagonal bore whereby the dog 104 is keyed to the sleeve for rotation therewith and is capable of being moved upon the sleeve in a direction parallel to the axis of the shaft 88. Projections 106 and 108 are located on opposite ends of the dog 104 for selective engagement with abutments 110 and 112 defined on the bevel gears 92 and 94, respectively. The clutch dog 104 is provided with an annular groove 114 for receiving the shift lever actuator 116, FIG. 6, which is mounted on the oscillatable shaft 118 journaled in the housing 68. A control rod 120 extends from the outer end of the shaft 118 through an opening 122 defined in the central base portion 12 of the tractor frame for access by the operator, FIG. 1. In this manner, shifting of the rod 120 permits the dog 104 to be selectively engaged with the gear 92 or 94, or neutrally interposed therebetween. In FIG. 5 the dog 104 is shown in the central or neutral position wherein rotation of the bevel gears 92 and 94 upon the shaft 88 will not be transmitted to the shaft.

A gear 124 is keyed upon the shaft 88 meshing with the differential case gear teeth 78 whereby rotation of the shaft 88 will cause the differential case 76 to rotate.

Rotation of the bevel gears 92 and 94 is produced by the beveled pinion gear 126, FIG. 6. A bearing support 128 is attached to the upper housing plate 64 and rotatably supports the shaft 130 by means of the antifriction bearings 132. The pinion 126 is attached to the lower end of shaft 130 and is in simultaneous engagement with the teeth 96 and 98 of the bevel gears 92 and 94, respectively, whereby rotation of the pinion 126 drives the gears 92 and 94 in opposite directions. The shaft 130 is rotated by a V-belt type pulley 134 keyed thereto at the hub 136. A nut 140 threaded upon the upper end of the shaft 130 maintains the assembly.

The V-belt 142 is mounted on pulleys 134 and 144, FIG. 3, the latter of which is mounted on the engine drive shaft 24. The V-belt 142 is of a length so that the belt loosely engages the pulleys 134 and 144, whereby a driving connection is not established between the pulleys until the belt is tightened.

The belt-tightening or clutching mechanism includes a clutch lever 146 which is pivotally mounted upon the plate 64 by a pivot bolt 148. An idler pulley 150 is rotatably mounted on the lever 146 and is adapted to roll against the inside V surfaces of the belt 142, as will be apparent from FIG. 4. A foot operated clutch lever 152 is pivotally mounted upon the tractor frame portion 21 and extends upwardly through a slot 154 defined in the right foot-receiving fender well, as will be noted in FIG. 1. A link 156 interconnects the foot clutch lever 152 to the lever 146, FIGS. 3 and 4, whereby upon depressing the foot lever 152 to a position adjacent the associated fender well front portion 30, the lever 146 will be pivoted to the dotted line position of FIG. 4 to tighten the belt and establish a driving relationship between the pulleys 134 and 144. A tension spring 158 is interposed between the plate 64, and the lever 146, to bias the lever toward the "declutched" position.

To provide braking means for the tractor, a brake lever 160 is pivotally mounted upon the plate 64 by a pivot bolt 162. The brake lever 160 includes a portion 164 having a hole defined therein whereby a tension spring 166 may be interposed between the hole and the plate 64 to bias the lever in the counterclockwise direction, as viewed in FIG. 4. A brake friction element 168 is mounted upon the lever portion 164 by screws and is of a configuration which aligns with and conforms to the converging surfaces defined in the pulley 134, note FIG. 6. The portion 170 of the brake lever 160 is angularly related to the portion 164 and includes a cam surface 172 which is adapted to be engaged by the cam surface 174 defined on the clutch lever 146, which is concentric with the axis of rotation of idler pulley 150 and extends thereabove.

With the components in the full line position shown in FIG. 4, wherein the pulley 134 is "declutched" from the pulley 144, the spring 166 will hold the brake element 168 in engagement with the pulley 134 and thereby prevent rotation of the pulley. Upon the clutch lever 146 being pivoted to the dotted line position, the clutch lever cam surface 174 will engage the brake lever cam surface 172 and pivot the brake lever 160 to the dotted line position shown in FIG. 4, which removes the brake element 168 from the pulley 134 permitting the pulley to freely rotate. It will be appreciated that this construction automatically brakes the pulley 134 upon "declutching" the pulley 134 from the engine pulley 144. The brake element 168 prevents the drive wheels 28 from rotating as long as the transmission is in either forward or reverse, in other words, when the clutch dog 104 is in driving engagement with either the gear 92 or the gear 94.

It will, therefore, be appreciated that by shifting the control rod 120, forward, neutral and reverse positions of the transmission are possible, and the differential interconnection between the axles 70 and 72 will permit easy turning. In that the tractor is steered from the rear, a very high degree of maneuverability is provided, and this feature has proved to be of significant importance when the tractor is employed with front mounted lawn mowing attachments. In that the power attachments used with the tractor are normally mounted upon the front thereof, a pulley 176 is mounted on the engine crankshaft 24 below pulley 144 which will be available for powering the lawn mowing, or other powered attachment, which may be used with the tractor. To this end, the tractor is provided with a lever 178 associated with appropriate linkage devices generally indicated at 180, FIG. 3, mounted upon the underside of the tractor frame portion 21 for mounting, supporting, and adjusting front mounted attachments.

To increase the traction characteristics of the tractor, differential "lock-out" means are incorporated in the transmission differential unit 66. Such lock-out means will be apparent from FIGS. 5 and 7 and include a sleeve 182 identical to the sleeve 100 mounted upon shaft 88. The sleeve 182 is provided with a hexagonal exterior configuration and is keyed at 184 to the axle 72. A clutch dog 186, having a hexagonal bore 188 which receives the sleeve 182, is mounted upon the sleeve for rotation therewith, and may be axially positioned thereon by means of an actuator 190 received within the annular groove 192 defined in the dog. A dog projection 194 is mounted upon the clutch dog for selective engagement with abutments 196 defined on the differential case 76. Thus, upon shifting the dog 180 to the left, FIG. 6, wherein the projection 194 engages a differential case abutment 196, the rotation of the differential case will be directly transferred to the axle 72, thereby bypassing the effect of the planetary gearing and causing simultaneous and identical rotation between the axles 70 and 72. The actuator 190 is mounted on a shaft 198 rotatably mounted in the housing 68 having a control rod 200 which extends through the base portion 12 for access by the operator, as will be apparent from FIG. 1. The differential "lock-out" finds particular use when traveling up steep inclines or operating on wet grass or slippery surfaces.

By locating the engine 22 slightly ahead of the transmission differential unit and drive wheels 28, the relative weight distribution on the drive wheels is high, with respect to the weight distribution upon the steering wheels 46. Thus, superior traction characteristics are provided while ease of steering is assured. It will be noted that as the driver's legs extend forwardly over the drive wheels 28, a significant portion of the driver's weight will also be transferred to the drive wheels. By locating and disposing the steering wheel 42 as shown, the operator's view to the front is unrestricted and, due to the low silhouette of the tractor at the front portions thereof, front mounted attachments may be readily observed.

It is understood that various modifications to the invention may be apparent to those skilled in the art, without departing from the spirit and the scope thereof, and it is intended that the invention be defined only by the scope of the following claims.

We claim:

1. A lawn tractor comprising, in combination,
   (a) a frame including a front portion and a rear portion,
   (b) drive wheels rotatably mounted upon and supporting said frame front portion,
   (c) fender portions defined on said frame front portion located adjacent said drive wheels, said fender portions including foot-receiving wells defined therein disposed ahead of said drive wheels,
   (d) at least one steerable wheel means rotatably mounted upon and supporting said frame rear portion,
   (e) an engine mounted upon said frame front portion,
   (f) drive means operatively connecting said engine with said drive wheels,
   (g) a seat mounted upon said frame rear portion, and
   (h) steering means mounted upon said frame operatively connected to said steerable wheel.

2. In a lawn tractor as in claim 1 wherein:
   (a) an axle is mounted to said frame rear portion, said steerable wheel means comprising
   (b) a pair of spaced steerable wheels mounted upon said axle, and
   (c) pivot means mounted upon said frame rear portion pivotably supporting said axle upon said frame, said pivot pin being disposed substantially parallel to the longitudinal length of said frame and to the usual direction of tractor movement, said axle being transversely disposed to said pivot pin.

3. In a lawn tractor, in combination,
   (a) a frame,
   (b) a plurality of wheels supporting said frame, at least one of said wheels constituting a drive wheel,
   (c) an engine mounted upon said frame,
   (d) a power transmission mounted upon said frame having an input shaft and an output shaft,
   (e) means connecting said output shaft to said drive wheel,
   (f) a pulley connected to said input shaft,
   (g) a power transmitting belt adapted to operatively connect said pulley to said engine,
   (h) a belt tightener lever pivotally mounted on said frame pivotally between belt-tightening and belt-slackening positions,
   (i) belt engaging means mounted upon said belt tightener lever,
   (j) a brake member lever pivotally mounted on said frame and biased to selectively frictionally engage said pulley and including first means defined thereon, and
   (k) second means directly mounted on said belt tightener lever engagable with said brake member lever first means upon shifting of said belt tightener lever to the belt-tightening position and disengage said brake member and pulley, and permit engagement of said brake member with said pulley upon shifting of said belt tightener lever to said belt-slackening position.

4. In a lawn tractor as in claim 3 wherein:
   (a) said brake member lever includes a brake lever pivotally mounted on said frame,
   (b) said first means comprising a cam surface defined on said brake lever, and
   (c) said second means including a cam surface engageable portion defined on said belt tightener lever adapted to engage said cam surface and pivot said brake lever upon pivoting of said belt tightener lever.

5. A lawn tractor comprising, in combination,
   (a) a frame including a front portion, a rear portion and a central portion,
   (b) said central portion and rear portion including an inverted channel member of sheet material having a base portion and downwardly extending side portions,
   (c) said frame front portion being defined by a formed front sheet metal portion affixed to said channel member and including longitudinal side wall portions and a recessed central portion intermediate said side wall portions,
   (d) drive wheels rotatably mounted upon said frame adjacent the junction of said channel member and said formed front sheet metal portion,
   (e) an engine mounted upon said front sheet metal portion upon said recessed central portion thereof and forward of said drive wheels,
   (f) drive means selectively drivingly connecting said engine to said drive wheels,
   (g) a foot-receiving means defined on each of said front sheet metal portion longitudinal side wall portions forward of said drive wheels,
   (h) at least one steerable wheel rotatably mounted upon and supporting said frame rear portion, (i) a seat mounted upon said frame rear portion, and
(j) steering means mounted upon said frame intermediate said engine and seat operatively connected to said steerable wheel.

References Cited

UNITED STATES PATENTS

| | | | |
|---|---|---|---|
| 2,304,443 | 12/1942 | Butler | 180—54 X |
| 2,375,184 | 5/1945 | Bernhard | 180—70 |
| 2,443,480 | 6/1948 | Schwitzer et al. | 180—77 X |
| 2,561,576 | 7/1951 | Johnson | 180—70 X |
| 2,855,060 | 10/1958 | Colburn | 180—11 |
| 3,198,276 | 8/1965 | Gordon | 180—70 X |

FOREIGN PATENTS

| | | |
|---|---|---|
| 882,808 | 7/1953 | Germany. |
| 3,215,000 | 11/1965 | Great Britain. |

A. HARRY LEVY, *Primary Examiner.*